US012794329B2

(12) United States Patent
Kozlowski et al.

(10) Patent No.: US 12,794,329 B2
(45) Date of Patent: Nov. 10, 2026

(54) EXTERNALLY EXCITED ELECTRIC SYNCHRONOUS MACHINE

(71) Applicant: MAHLE International GmbH, Stuttgart (DE)

(72) Inventors: Peter Kozlowski, Stuttgart (DE); Penyo Topalov, Stuttgart (DE); Philipp Zimmerschied, Stuttgart (DE)

(73) Assignee: MAHLE International GmbH (DE)

( * ) Notice: Subject to any disclaimer, the term of this patent is extended or adjusted under 35 U.S.C. 154(b) by 192 days.

(21) Appl. No.: 18/700,702

(22) PCT Filed: Oct. 11, 2022

(86) PCT No.: PCT/EP2022/078211
§ 371 (c)(1),
(2) Date: Apr. 11, 2024

(87) PCT Pub. No.: WO2023/061990
PCT Pub. Date: Apr. 20, 2023

(65) Prior Publication Data
US 2024/0405649 A1 Dec. 5, 2024

(30) Foreign Application Priority Data
Oct. 12, 2021 (DE) ........................ 102021211472.5

(51) Int. Cl.
*H02P 1/46* (2006.01)
*H01F 38/18* (2006.01)
(Continued)

(52) U.S. Cl.
CPC ............ *H02K 19/12* (2013.01); *H01F 38/18* (2013.01); *H02K 11/0094* (2013.01);
(Continued)

(58) Field of Classification Search
CPC ......... H02K 19/12; H02P 1/46; H02P 25/022; H02P 6/28; H02P 29/0241; H02P 2207/05
See application file for complete search history.

(56) References Cited

U.S. PATENT DOCUMENTS 8,508,179 B2 8/2013 Schmidt
10,862,374 B2 12/2020 Sudan
2016/0149528 A1* 5/2016 Frampton .............. H02P 9/302 322/20

FOREIGN PATENT DOCUMENTS

CN 204089656 U 1/2015
DE 102008032210 A1 1/2010
(Continued)

OTHER PUBLICATIONS

English abstract for DE-102014201903.
(Continued)

*Primary Examiner* — Karen Masih
(74) *Attorney, Agent, or Firm* — Fishman Stewart PLLC

(57) ABSTRACT

An externally excited electric synchronous machine may include a machine rotor, a rectifier circuit, a protection circuit, a switch, and a trigger circuit. The machine rotor may include a rotor shaft and a machine rotor coil non-rotatably arranged on the rotor shaft. The machine rotor coil may provide a magnetic rotor field during operation. The rectifier circuit may be configured to convert a transformer voltage into a DC voltage, which may be provided to the rotor coil. The protection circuit may be configured to protect the rectifier circuit from overvoltage and may be connected in parallel between the machine rotor and the rectifier circuit. The switch may be arranged between the rectifier circuit and the protection circuit. The trigger circuit may be connected to the switch and may be configured to open the switch for demagnetizing the machine rotor coil.

20 Claims, 7 Drawing Sheets

(51) Int. Cl.

| | |
|---|---|
| ***H02K 11/00*** | (2016.01) |
| ***H02K 11/042*** | (2016.01) |
| ***H02K 11/26*** | (2016.01) |
| ***H02K 11/27*** | (2016.01) |
| ***H02K 11/35*** | (2016.01) |
| ***H02K 19/12*** | (2006.01) |

(52) U.S. Cl.
CPC ........... *H02K 11/042* (2013.01); *H02K 11/26* (2016.01); *H02K 11/27* (2016.01); *H02K 11/35* (2016.01)

(56) References Cited

FOREIGN PATENT DOCUMENTS

| | | | |
|---|---|---|---|
| DE | 102014201903 | A1 | 8/2015 |
| DE | 102014209607 | A1 | 11/2015 |
| DE | 102016207392 | A1 | 11/2017 |
| DE | 102017214766 | A1 | 4/2018 |
| JP | H08191598 | A | 7/1996 |

OTHER PUBLICATIONS

English abstract for DE-102017214766.
English abstract for CN-204089656.
English abstract for DE-10 2016 207 392.
Japanese Office Action, JP2024-521336, dated Jun. 2, 2026 (w_translation).
English abstract for JPH08191598.

* cited by examiner

EXTERNALLY EXCITED ELECTRIC SYNCHRONOUS MACHINE

CROSS-REFERENCE TO RELATED APPLICATIONS

This application claims priority to International Patent Application No. PCT/EP2022/078211, filed on Oct. 11, 2022, and German Patent Application No. DE 10 2021 211 472.5, filed on Oct. 12, 2021, the contents of both of which are hereby incorporated by reference in their entirety.

TECHNICAL FIELD

The present invention relates to an externally excited electric synchronous machine having a machine rotor coil, which during the operation is supplied with a DC voltage by means of a transformer coil and a rectifier circuit and generates a rotor field. Further, the invention relates to users of such an externally excited electric synchronous machine.

BACKGROUND

An externally excited electric synchronous machine comprises a fixed stator and a rotor which rotates relative to the stator about an axis of rotation during the operation, which in the following are also referred to as machine stator and machine rotor. There, a magnetic rotor field of the machine rotor and a magnetic stator field of the machine stator interact. In the externally excited electric synchronous machine the required rotor field of the machine rotor is externally excited. For this purpose, the machine rotor generally comprises a machine rotor coil which is supplied with a DC voltage for generating the magnetic field. The supply of the machine rotor coil with electric energy can take place inductively. For this purpose, an AC voltage is induced in a secondary coil during the operation. The induced AC voltage is converted via a rectifier circuit into the required DC voltage and supplied to the machine rotor coil.

Such an externally excited synchronous machine is known from DE 10 2016 207 392 A1. The externally excited electric synchronous machine has a smoothing capacity in parallel with the machine rotor coil and with the rectifier circuit. In addition, a load element is connected in series with the machine rotor coil. The load element comprises two connections which are connected to the connected switch terminals of a switch. A control terminal of the switch is controlled via a voltage divider. Thus it is possible to demagnetize the machine rotor coil if required, in particular in the event of a defect.

SUMMARY

The present invention deals with the object of stating for an externally excited electric synchronous machine of the type mentioned at the outset an improved or at least another embodiment. In particular, the present invention deals with the object of stating for the externally excited electric synchronous machine an embodiment which is characterised by an improved demagnetization of a machine rotor coil of the synchronous machine.

According to the invention, this object is achieved through the subject matter of the independent claim(s). Advantageous embodiments are the subject matter of the dependent claim(s).

Accordingly, the present invention is based on the general idea of employing for the demagnetization of a machine rotor coil of an externally excited electric synchronous machine a protection circuit provided for an overvoltage protection of a rectifier circuit for the machine rotor coil connected in parallel with the machine rotor coil, wherein a switch for the demagnetization of the machine rotor coil arranged between the protection circuit and a rectifier circuit disconnects an electrical connection of the machine rotor coil to the rectifier circuit. Thus, the protection circuit is simultaneously employed for protecting the rectifier circuit and for demagnetizing the machine rotor coil. Thus, a simple and reliable demagnetization by means of the protection circuit is achieved, wherein the energy stored in the machine rotor coil is consumed during the demagnetization by means of the protection circuit. Further, a simplified construction of the externally excited electric synchronous machine with fewer components and a reduced installation space requirement thus ensue for realising the demagnetization.

According to the inventive idea, the externally excited electric synchronous machine, in the following also referred to as synchronous machine in brief, comprises a rotor and a stator. In the following, the rotor is also referred to as machine rotor and the stator as machine stator. The machine rotor comprises a rotor shaft on which the machine rotor coil is non-rotatably provided. During the operation, the machine rotor coil generates a magnetic field which is also referred to as rotor field in the following. The machine rotor coil comprises two connections which in the following are also referred to as first rotor coil terminal and second rotor coil terminal. The machine stator comprises at least one coil fixed relative to the machine stator, which is also referred to as machine stator coil in the following. During the operation, the at least one machine stator coil generates a magnetic field which in the following is also referred to as stator field. The rotor field and stator field interact during the operation in such a manner that the machine rotor rotates about an axial axis of rotation. For generating the rotor field, the machine rotor coil requires a DC voltage which is supplied to the machine rotor coil via a coil, in which an AC voltage is induced during the operation. This voltage is also referred to as transformer voltage in the following. The coil is also referred to as transformer secondary coil in the following. Thus, the transformer secondary coil serves for the electrical supply of the machine rotor coil. The transformer secondary coil is non-rotatably connected to the machine rotor. The rectifier circuit is connected between the transformer secondary coil and the machine rotor coil. During the operation, the rectifier circuit converts the transformer voltage induced in the transformer secondary coil into the DC voltage for the machine rotor coil. The rectifier circuit is configured accordingly. The rectifier circuit comprises two connections which are also referred to as first rectifier terminal and second rectifier terminal in the following. The protection circuit serves for protecting the rectifier circuit from overvoltage and comprises two connections, which are also referred to as first protection terminal and second protection terminal in the following. The first rectifier terminal is connected to the first protection terminal and the second rectifier terminal to the second protection terminal. In addition, the first protection terminal is connected to the first rotor coil terminal and the second protection terminal to the second rotor coil terminal in such a manner that the protection circuit is connected in parallel between the machine rotor and the rectifier circuit. The switch is arranged between the second rectifier terminal and the second protection terminal. In addition, the synchronous machine comprises a trigger circuit which is connected to the switch and configured in such a manner that it opens the switch for demagnetizing the machine rotor coil.

The direction stated here relate to the axis of rotation. Accordingly, "axial" extends parallel to the axis of rotation. In addition, "radial" extends transversely to the axis of rotation.

The first rectifier terminal and the second rectifier terminal serve for electrically connecting the rectifier circuit to the machine rotor coil and are thus output connections of the rectifier terminal. Advantageously, the rectifier circuit comprises two further rectifier terminals on the inlet side for the incoming transformer AC voltage.

Advantageously, the protection circuit also serves for protecting the machine rotor coil from overvoltage.

The rectifier circuit, the protection circuit and the trigger circuit are advantageously non-rotatably fixed to the machine rotor. This means that the rectifier circuit, the protection circuit and the trigger circuit co-rotate with the machine rotor about the axis of rotation during the operation.

In the opened state of the switch, the electrical connection between the second rectifier terminal and the second protection terminal is disconnected. In contrast with this, the electrical connection between the second rectifier terminal and the second protection terminal is established in the closed state of the switch.

Basically, the rectifier circuit can be configured as desired.

Preferred are embodiments, in which the rectifier circuit is configured in such a manner that it blocks the current flows in the direction of the transformer secondary coil. By contrast, the rectifier circuit allows current flows in the direction of the machine rotor coil. Thus, there is an accelerated demagnetization of the machine rotor coil when the switch is opened. For this purpose, the rectifier circuit can be configured as desired. In particular, the rectifier circuit, for this purpose, can be configured as a bridge rectifier with four diodes.

Advantageously, the switch is merely opened for demagnetizing the machine rotor coil. Otherwise the switch remains closed so that there is a normal operation in which the machine rotor coil is supplied with the DC voltage provided by means of the rectifier circuit.

Advantageously, the protection circuit is such as consumes the voltage exceeding the limit voltage when a predetermined limit voltage is exceeded. Advantageously, the protection circuit comprises at least one load element, for example a suppressor diode, a varistor, an IGBT circuit and the like.

When for demagnetizing the machine rotor coil the switch is opened, a current flow is only possible via the protection circuit which results in a reduction of the energy stored in the machine rotor coil. During this, the voltage on the protection circuit above the limit voltage rises so that the protection circuit consumes the energy. At the same time, the reducing rotor field results in a commutation of the current and thus a pole reversal of the voltage on the machine rotor coil. This results in a quicker demagnetization of the machine rotor coil via the protection circuit.

The switch can basically be configured as desired provided it can be opened and closed with the trigger circuit.

Advantageously, the switch is configured as a transistor, preferably as a MOSFET or an IGBT. Advantageously, the switch can moreover be operated with the least loss in the switched-on state. Thus, the switch can be switched reliably and effectively and with low switching voltages. The switch comprises a control terminal which is connected to the trigger circuit. In addition, the switch comprises two switching terminals, which are also referred to as first switching terminal and second switching terminal. Preferably, the second rectifier terminal is connected to the first switching terminal and the second protection terminal to the second switching terminal.

When the switch is configured as a MOSFET, the control terminal corresponds to the gate, the first switch terminal preferably to the source and the second switch terminal preferably to the drain.

Basically, the trigger circuit can be configured as desired provided it opens the switch for demagnetizing the machine rotor coil.

The trigger circuit can be configured in particular in such a manner that in the event of a defective function of the transformer secondary coil and/or in the event of an absent or insufficient transformer voltage it opens automatically.

In advantageous embodiments, the trigger circuit comprises a voltage divider. The voltage divider is such that the switch is opened when a transformer voltage is absent. "Absent" transformer voltage is to mean both a missing and also an insufficient transformer voltage. For opening the switch with absent transformer voltage, the voltage divider is preferably connected to the control terminal and the first switching terminal of the switch. Thus, the switch can be opened and closed independently of the voltage differential between the control terminal and the first switching terminal. The voltage divider is configured accordingly.

Practically, the voltage divider comprises two passive bipoles, in particular two electrical resistors.

It is conceivable that the voltage divider is connected to the rectifier circuit in such a manner that the switch in the event of absent DC voltage through the rectifier circuit opens. "Absent" DC voltage is to mean both a missing and also an insufficient DC voltage. Thus, there is a demagnetization of the machine rotor coil when no or an insufficient DC voltage is provided by the rectifier circuit.

Preferably, the inducing of the transformer voltage in the transformer secondary coil takes place by means of an electric rotary transformer, of which the transformer secondary coil is part. This results in a simple, effective and reliable energy transmission to the transformer secondary coil.

Thus, the synchronous machine preferably comprises the electric rotary transformer. The rotary transformer comprises a stator and a rotor, which in the following are also referred to as rotary transformer stator and rotary transformer rotor. The rotary transformer stator comprises a coil which is also referred to as transformer primary coil in the following. The rotary transformer stator is fixed relative to the machine stator and the rotary transformer rotor is non-rotatable relative to the machine rotor. Thus, the rotary transformer rotor is rotatable relative to the rotary transformer stator about the axis of rotation and co-rotates with the machine rotor about the axis of rotation during the operation. The machine rotor comprises the transformer secondary coil. During the operation, the transformer primary coil and the transformer secondary coil inductively interact for inducing the transformer voltage in the transformer secondary coil. This means that the transformer primary coil induces the transformer voltage in the transformer secondary coil during the operation.

The transformer primary coil and the transformer secondary coil can be arranged located axially opposite one another. The transformer primary coil and the transformer secondary coil can likewise be arranged radially opposite one another.

Conceivable are embodiments, in which the trigger circuit comprises a coil that is inductively coupled to the transformer primary coil and is separate from the transformer secondary coil, which separate coil is also referred to as trigger coil in the following. During the operation, the transformer primary coil induces in the trigger coil a voltage which in the following is also referred to as trigger voltage. The trigger coil is connected to the voltage divider in such a manner that the switch opens when the trigger voltage is absent. "Absent" regarding the trigger voltage is to mean both a missing and also an insufficient trigger voltage. Thus, a demagnetization of the machine rotor coil takes place as soon as by means of the transformer primary coil no or an insufficient voltage is induced. By way of the trigger coil that is separate from the transformer secondary coil, an influence of the trigger circuit on the transformer secondary coil is prevented or at least reduced.

An independent demagnetization of the machine rotor coil can be effected by a signal transmission to the trigger circuit, wherein the trigger circuit opens the switch on receiving a control signal. The control signal can be generated independently of the function of the rotary transformer and/or of the machine rotor coil and sent to the trigger circuit. Thus, a high flexibility in the demagnetization of the machine rotor coil is achieved.

For this purpose, the synchronous machine preferably comprises a signal transmission device for the wireless signal transmission to the trigger circuit. The trigger circuit is configured in such a manner that on receiving the control signal it opens the switch. For this purpose, the trigger circuit comprises a receiver that is non-rotatably fixed to the machine rotor for receiving the control signal and/or is communicatingly connected to such a receiver.

Alternatively or additionally, the trigger circuit can initiate a demagnetization of the machine rotor coil when a defect is present and/or an excessive electric current flows through the machine rotor coil.

For this purpose, the trigger circuit preferably comprises an ammeter. The ammeter is configured in such a manner that it determines the electric current flowing through the machine rotor coil during the operation. The trigger circuit is configured in such a manner that it opens the switch when the current determined by means of the ammeter exceeds a predetermined value.

Basically, the ammeter can be configured as desired. In particular, the ammeter can comprise a shunt and/or a Hall sensor.

For switching the switch, the trigger circuit preferably comprises a comparator connected to the ammeter and a gate driver circuit connected to the comparator and the switch. The gate driver circuit is thus connected between the comparator and the switch and preferably connected to the control terminal of the switch.

It is to be understood that the machine rotor can comprise two or more machine rotor coils.

The machine stator advantageously comprises at least two machine stator coils.

Preferably, the machine stator comprises three or an entire multiple of three machine stator coils. The number of the machine stator coils thus preferably corresponds to 3*N wherein N is a natural number greater than zero.

Basically, the synchronous machine can be employed in any applications.

The synchronous machine can be employed in particular in a motor vehicle, which as electrical energy source for operating the synchronous machine can include a battery. The synchronous machine serves in particular for driving the motor vehicle, is thus configured in particular as an externally excited electric synchronous motor and a traction motor.

Likewise, the synchronous machine, as servomotor, can adjust an adjusting element, in particular in a motor vehicle during the operation.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components.

BRIEF DESCRIPTION OF THE DRAWINGS

It shows, in each case schematically.

DETAILED DESCRIPTION

Figure 1:
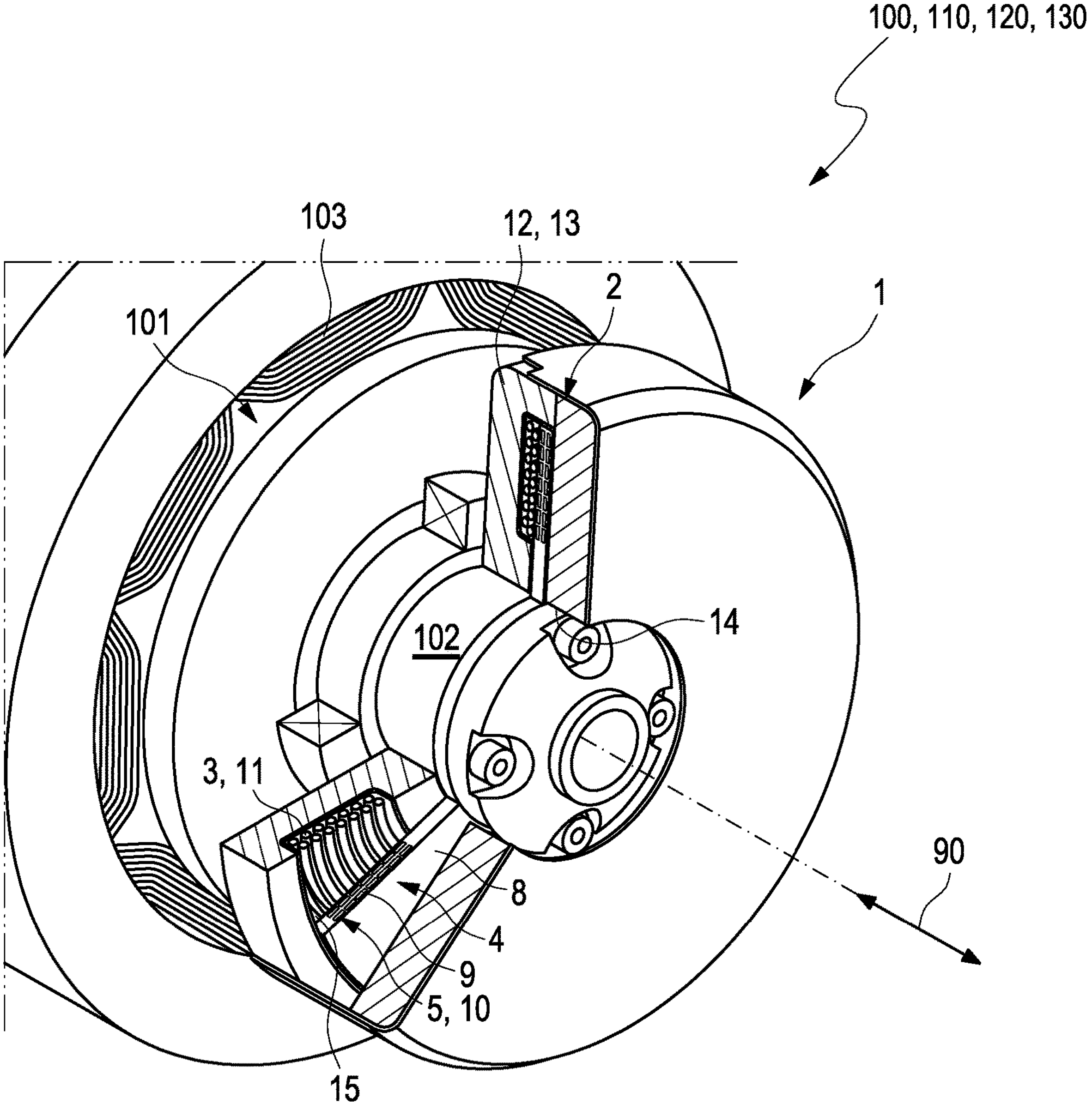
FIG. 1 shows an isometric partly sectioned view of a part of an externally excited electric synchronous machine with an inductive rotary transformer, FIGS. 2 to 6 each show a highly simplified extract from the circuit diagram of the externally excited electric synchronous machine in a motor vehicle.
Figure 2:
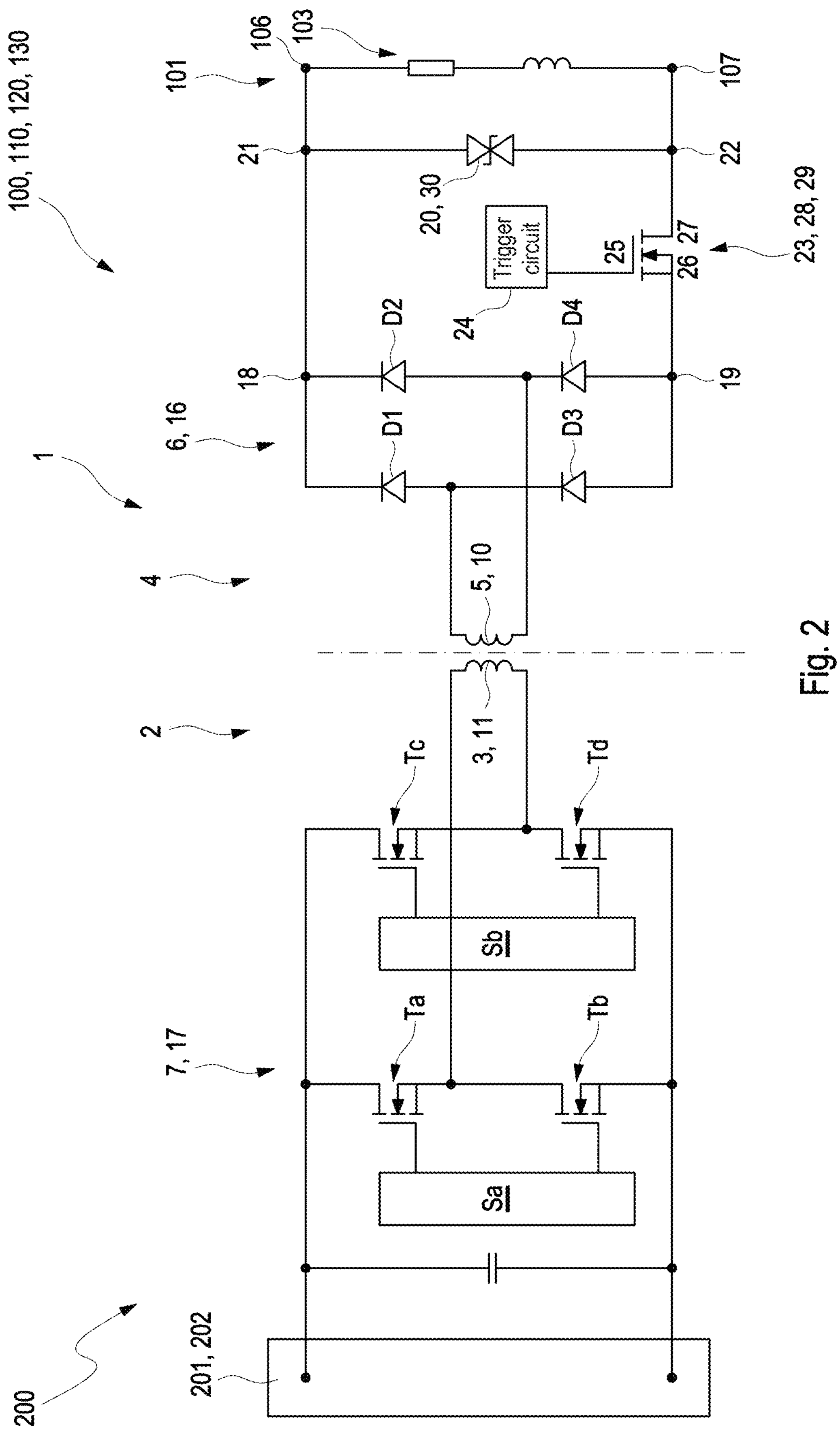

An externally excited electric synchronous machine 100, in the following also referred to as synchronous machine 100 in brief, such as is shown for example in the FIGS. 1 to 7, can be employed in a motor vehicle 200 (see FIGS. 2 to 6). The externally excited electric synchronous machine 100 can be employed as a synchronous motor 110 for driving the motor vehicle 200, i.e. as a traction motor 120. The externally excited electric synchronous machine 100 can also be employed as a synchronous motor 110 for adjusting an adjusting element, i.e. as servomotor 130.

Figure 6:
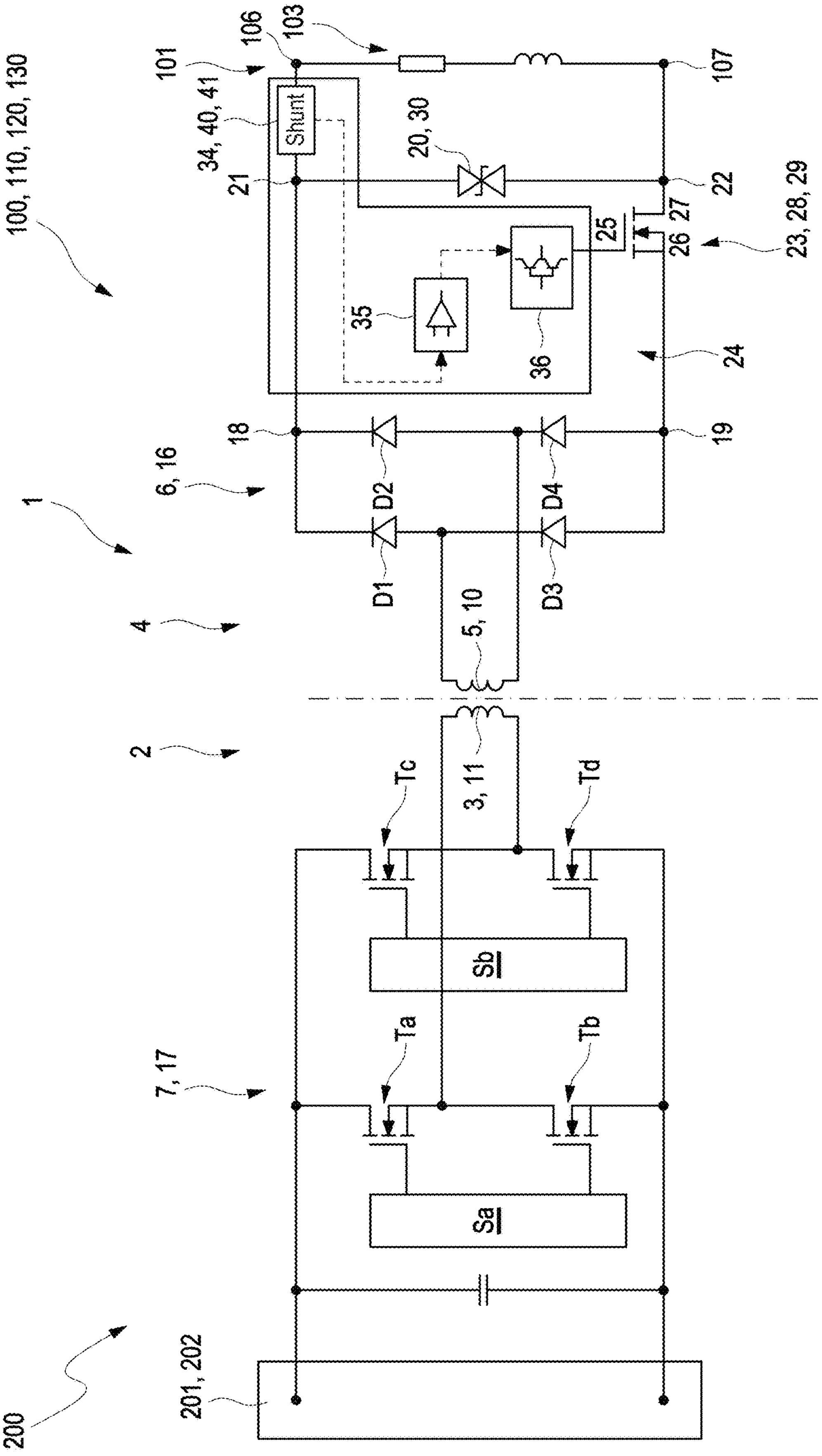
Figure 7:
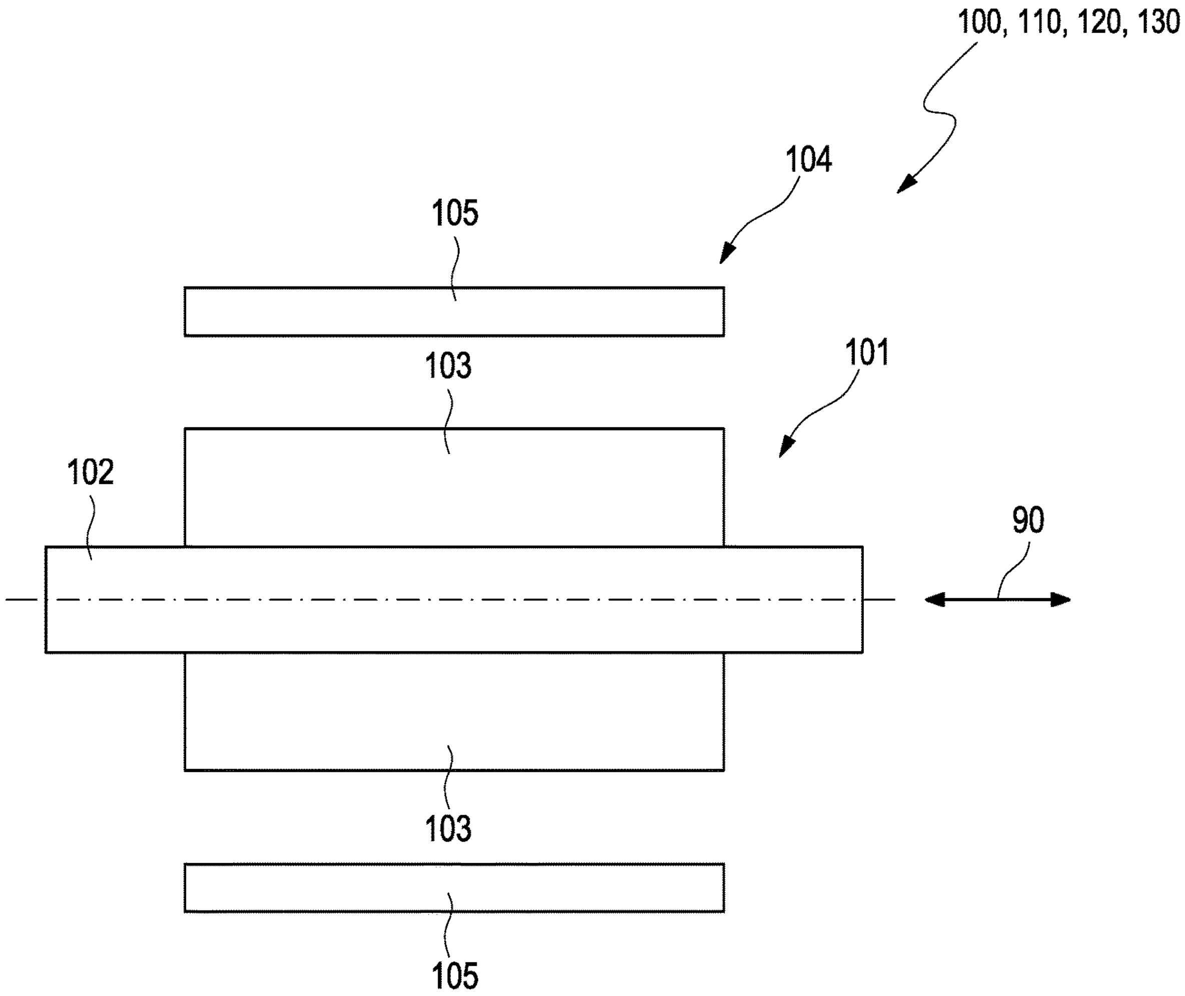
FIG. 7 shows highly simplified section through the externally excited electric synchronous machine.

The synchronous machine 100, as is evident in particular from the FIGS. 1 and 7, comprises a rotor 101. In the following, the rotor 101 is also referred to as machine rotor 101. The machine rotor 101 comprises a rotor shaft 102 and a coil 103 that is non-rotatably provided on the rotor shaft 102 (see FIGS. 2 to 6). In the following, the coil 103 is also referred to as machine rotor coil 103. During the operation, the machine rotor coil 103 generates a magnetic field which is also referred to as rotor field in the following. The machine rotor coil 103 is symbolised in the FIGS. 1 to 6 as an inductivity and an ohmic resistor. The synchronous machine 100, further, comprises a stator 104 shown in FIG. 7, which in the following is also referred to as machine stator 104. The synchronous machine 100 comprises at least one coil (105) that is fixed relative to the machine stator 104 (see FIG. 7), which in the following is also referred to as machine stator coil 104. During the operation, the at least one machine stator coil 105 generates a magnetic field which is also referred to as stator field in the following. Stator field and rotor field interact with one another during the operation in such a manner that the machine rotor 101 rotates about an axial axis of rotation 90. For generating the rotor field, the machine rotor 101, in particular the machine rotor coil 103, requires a DC voltage. For supplying the machine rotor coil 103 with the DC voltage, the machine rotor coil 103 comprises two connections 106, 107, which are also referred to as first rotor coil terminal 106 and second rotor coil terminal 107 in the following. The DC voltage is supplied to the machine rotor coil 103 by means of a transformer secondary coil 5, in which an AC voltage is inductively induced during the operation.

The directions stated here relate to the axis of rotation 90. Accordingly, "axial" extends parallel to the axis of rotation. In addition, "radial" extends transversely to the axis of rotation 90.

In the shown exemplary embodiments, the transformer secondary coil 5 is part of an electric rotary transformer 1. The rotary transformer 1 comprises a stator 2 and a rotor 4. In the following, the stator 2 is referred to as rotary transformer stator 2. In the following, the rotor 3 is referred to as rotary transformer rotor 4. The rotary transformer stator 2 is non-rotatably fixed relative to the machine stator 104. The rotary transformer rotor 4 is non-rotatably fixed relative to the machine rotor 101. Thus, the rotary transformer rotor 4 is thus rotatable about the axis of rotation 90 relative to the rotary transformer stator 2. During the operation, the rotary transformer rotor 4 thus co-rotates with the machine rotor 101 relative to the rotary transformer stator 2 about the axis of rotation 90. For the inductive energy transmission, the rotary transformer stator 2 comprises a primary coil 3 and the rotary transformer rotor 4 the transformer secondary coil 5. In the following, the primary coil 3 is also referred to as transformer primary coil 3. As is evident from FIG. 1, the transformer primary coil 3 and the transformer secondary coil 5 are arranged located axially opposite one another in the shown exemplary embodiments. During the operation, the transformer primary coil 3 induces in the transformer secondary coil 5 the AC voltage, which is also referred to as transformer voltage in the following.

In order to supply the machine rotor coil 103 with the required DC voltage, a rectifier circuit 6 is connected between the transformer secondary coil 5 and the machine rotor coil 103 as is evident in the FIGS. 2 to 6, which converts the transformer voltage into the DC voltage. The rectifier circuit 6 is non-rotatably fixed to the machine rotor 101 and can be part of the rotary transformer rotor 4.

As is evident, further, in particular from FIG. 1, the rotary transformer 1, in the shown exemplary embodiments, is arranged on an axial face-end of the machine rotor 101 and spaced apart relative to the machine rotor coil 103 and relative to the at least one machine stator coil 105.

For inducing the transformer voltage in the transformer secondary coil 5, the transformer primary coil 3 requires an AC voltage. As is evident from the FIGS. 2 to 6, the transformer primary coil 3 in the shown exemplary embodiments is supplied via an electrical energy source 201, which provides a DC voltage. The energy source 201 in the shown exemplary embodiments is a battery 202 of the motor vehicle 200. For supplying the transformer primary coil 3 with the AC voltage, an inverter circuit 7 is provided between the energy source 201 and the transformer primary coil 3. The inverter circuit 7 converts the DC voltage of the energy source 201 into the AC voltage for the transformer primary coil 3. It is conceivable that the inverter circuit 7 includes a converter.

As is evident from FIG. 1, the rotary transformer rotor 4 in the shown exemplary embodiments comprises a circuit board 8, which is provided with the transformer secondary coil 5. The circuit board 8 is configured disc-like and has a round shape, i.e. is configured in the manner of a round disc or of a ring. The transformer secondary coil 5 in the shown exemplary embodiments comprises at least one trace 9 of the circuit board 8, which is also referred to as transformer trace 9 in the following. In the shown exemplary embodiments, the transformer secondary coil 5 consists of the at least one transformer trace 9 and is configured as a planar winding 10.

As shown in FIG. 1, a non-rotatably fixed connection of the rotor shaft 102 to the rotary transformer rotor 4 can be realised via an opening 14 that is central in the circuit board 8, through which the rotor shaft 102 is passed.

As is evident from FIG. 1, the transformer primary coil 3 can be configured as a flat coil 11. As is evident, further, from FIG. 1, the transformer primary coil 3 and the transformer secondary coil 5 are arranged in the shown exemplary embodiments in a magnetic core 12, in particular in a ferrite core 13, that is fixed relative to the rotary transformer stator 2. The magnetic core 12 is also referred to as transformer magnetic core 12 in the following. The transformer magnetic core 12 is radially open, so that the circuit board 9 with the transformer secondary coil 5 enters the transformer magnetic core 12 and is rotatably arranged therein. In addition, the transformer magnetic core 12 comprises an axially open recess 15, in which the transformer primary coil 3 is arranged.

In the shown exemplary embodiments, the rectifier circuit 6 is purely exemplarily configured as a bridge rectifier 16 with four diodes D1-D4 namely a first diode D1, a second diode D2, a third diode D3 and a fourth diode D4. The first diode D1 and the third diode D3 as well as the second diode D2 and the fourth diode D4 are each connected in series and parallel to the transformer secondary coil 5 and to the machine rotor coil 103. Thus, the rectifier circuit 6 merely allows electric currents in the direction of the machine rotor coil 103 and blocks currents in the direction of the transformer secondary coil 5.

In the shown exemplary embodiments, the inverter circuit 7 is purely exemplarily configured as a full bridge inverter 17, which comprises four transistors Ta-d and two switches Sa-b.

On the output side, the rectifier circuit 6 comprises two connections 18, 19, which are also referred to as first rectifier terminal 18 and second rectifier terminal 19 in the following. In the shown exemplary embodiments, the transformer secondary coil 5 is connected to the rectifier circuit 6 between the first diode 1 and the third diode D3 and between the second diode D2 and the fourth diode D4.

As is evident from the FIGS. 2 to 6, a protection circuit 20 is provided in parallel between the machine rotor coil 103 and the rectifier circuit 6, which protects the machine rotor coil 103 from overvoltage. In the shown exemplary embodiments, the protection circuit 20 is configured as a bidirectional suppressor diode 30. The protection circuit 20 comprises two connections 21, 22, which are also referred to as first protection terminal 21 and second rectifier terminal 19 in the following. The first protection terminal 21 is connected to the first rotor coil terminal 106 and the second protection terminal 22 to the second rotor coil terminal 107. In addition, the first protection terminal 21 is connected to the first rectifier terminal 18. The second protection terminal 22 is connected to the second rectifier terminal 19 via a switch 23. Thus, the protection circuit 20 is connected in parallel between the machine rotor 101 and the rectifier circuit 6. In the closed state, the switch 23 connects the second rectifier terminal 19 and the second protection terminal 22 electrically and in the opened state disconnects the electrical connection between the second rectifier terminal 19 and the second protection terminal 22. A trigger circuit 24 is connected to the switch 23 and configured in such a manner that it opens the switch 23 for demagnetizing the machine rotor coil 103. Otherwise the switch 23 is closed so that the machine rotor coil 103 generates the rotor field.

When the switch 23 is opened, a current flow from the machine rotor coil 103, because of the opened switch 23 and the configuration of the rectifier circuit 6, is only possible through the protection circuit 20. Because of this, the voltage on the protection circuit 20 increases so that a limit voltage of the protection circuit 20 is quickly reached. In addition, a commutation of the current occurs through the reducing rotor field. The result is a pole reversal of the voltage on the machine rotor coil 103. Thus, a quick demagnetization of the machine rotor coil 103 occurs via the protection circuit 20.

In the shown exemplary embodiments, the switch 23 comprises control terminal 25 and two switching terminals 26, 27. The switching terminals 26, 27 are also referred to as first switching terminal 26 and second switching terminal 27. The switch 23 is thus configured as a transistor 28, preferably as a MOSFET 29. The trigger circuit 24 is connected to the control terminal 25. In addition, the second rectifier terminal 19 is connected to the first switching terminal 26 and the second protection terminal 22 to the second switching terminal 27. Thus, low voltages are necessary for switching the switch 23. Thus, the trigger circuit 24 can be reliably and effectively operated. In the case of the switch 23 configured as MOSFET 29, the control terminal 25 corresponds to the gate. In addition, the first switch terminal 26 in the shown exemplary embodiments corresponds to the source and the second switch terminal 27 to the drain.

Figure 3:
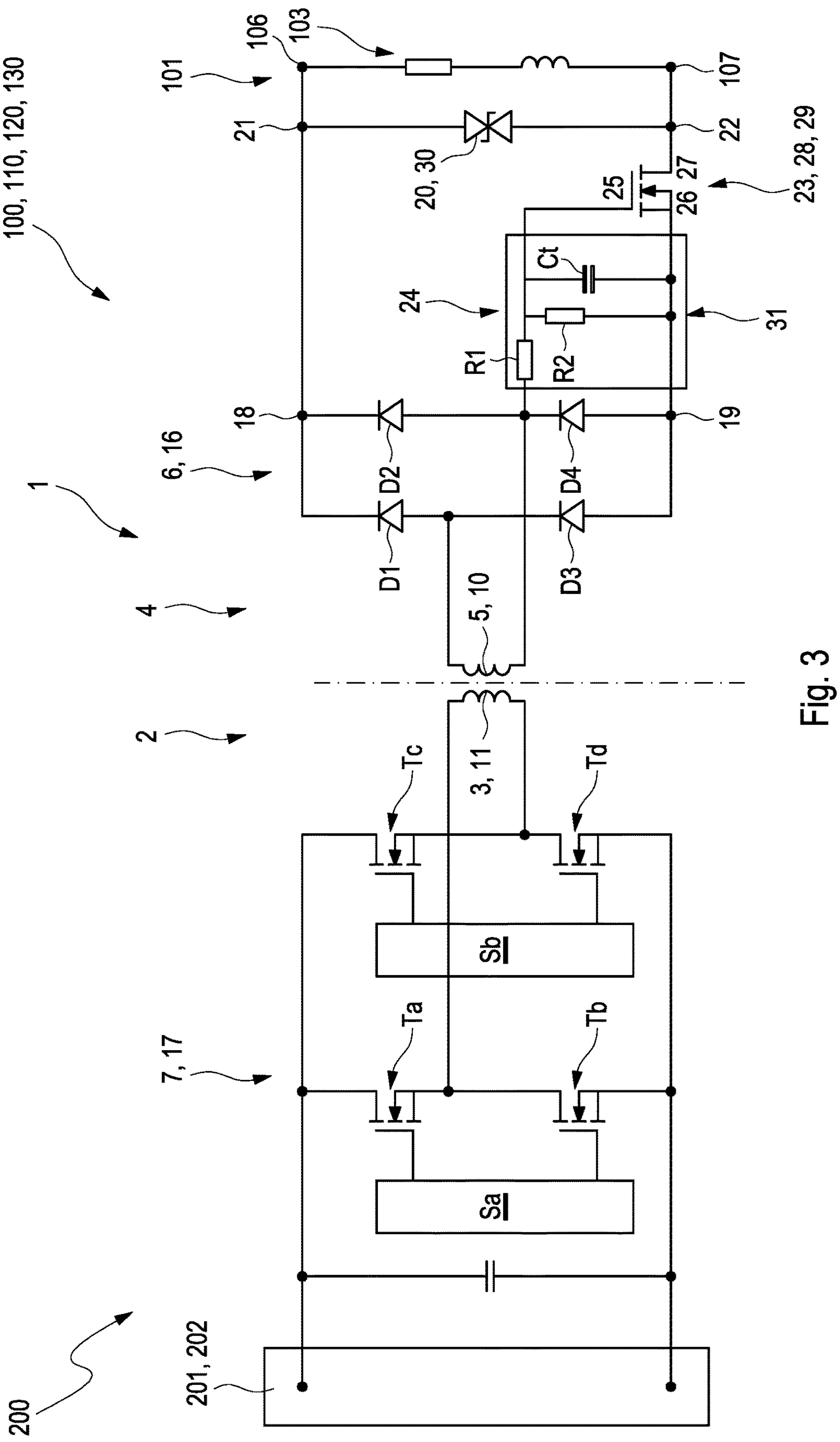
Figure 4:
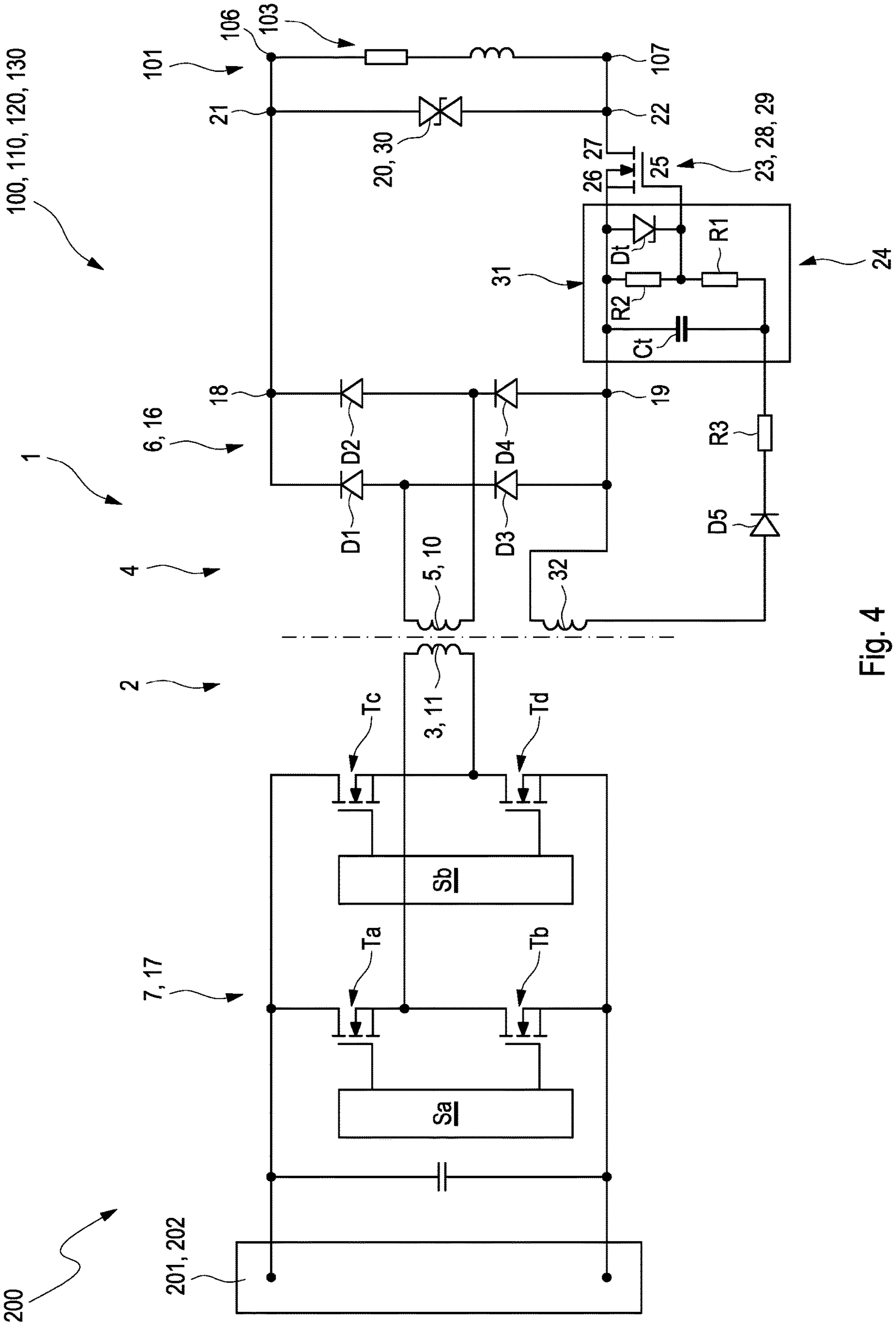
Figure 5:
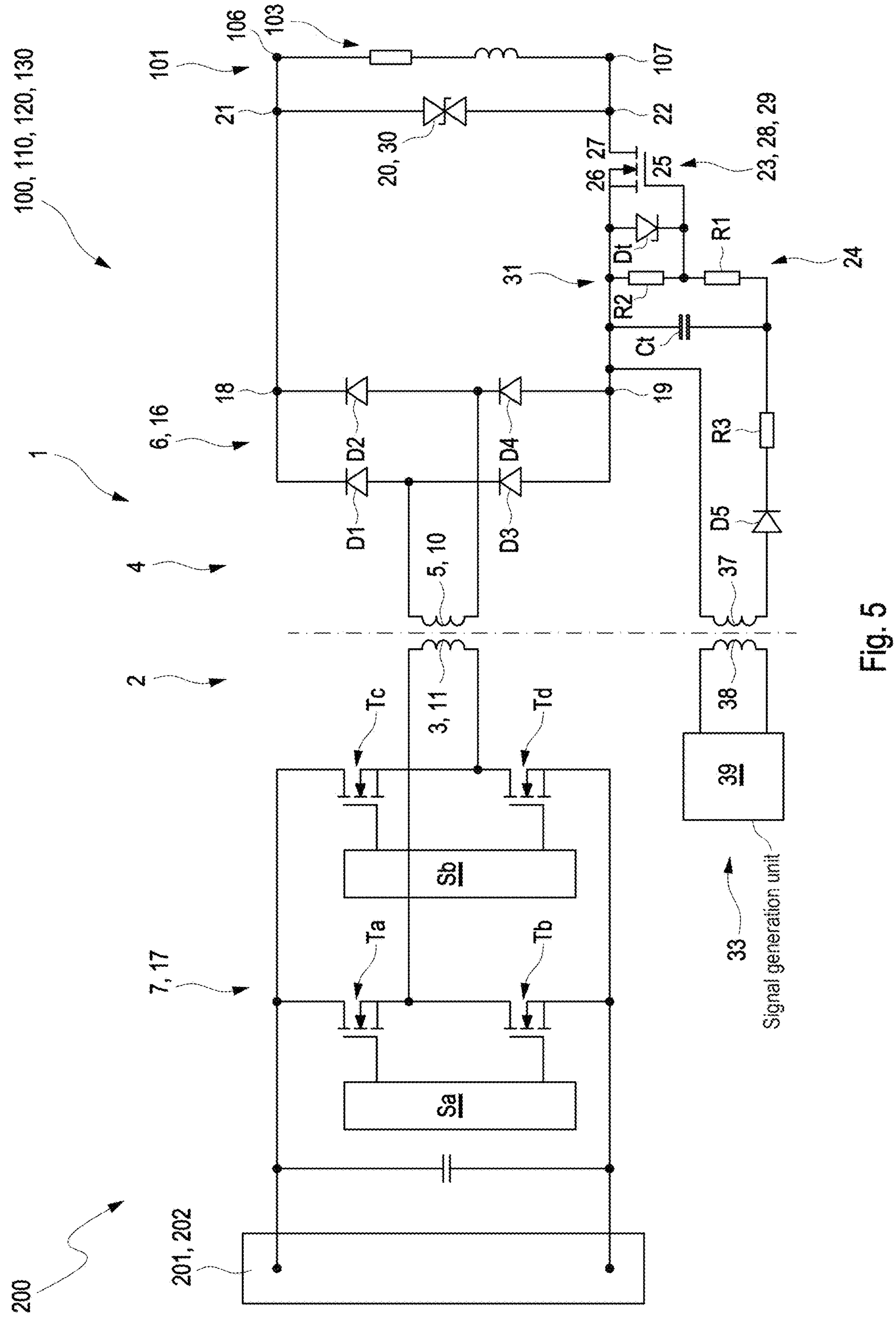

In the exemplary embodiments shown in the FIGS. 3 to 5, the trigger circuit 24 comprises a voltage divider 31. The voltage divider 31 comprises two electrical resistors R1 and R2 in the known manner, namely a first resistor R1 and a second resistor R2, as passive bi-poles and is connected to the control terminal 25 and the first switching terminal 26. In the shown exemplary embodiments, the trigger circuit 24 further comprises a capacitor Ct.

In the exemplary embodiments shown in the FIGS. 3 and 4, the voltage divider is such that the switch 23, with absent transformer voltage, i.e. with missing or insufficient transformer voltage, opens. Thus, a demagnetization of the machine rotor coil 103 occurs for example when the rotary transformer 1 is out of operation.

In the exemplary embodiment of FIG. 3, the voltage divider 31 is connected via the first resistor R1 to the fourth diode D4 of the rectifier circuit 6 and thus to the transformer secondary coil 5. Further, the first resistor R1 is connected to the control terminal 25. The second resistor R2 is connected to the second rectifier terminal 19 and the first switching terminal 26. When the rectifier circuit 6 provides an absent, i.e. no or an insufficient DC voltage, the voltage differential between the control terminal 25 and the first switching terminal 26 falls below the threshold voltage of the switch 23, and the switch 23 opens. The consequence is that the switch 23 with absent DC voltage through the rectifier circuit 6 opens and demagnetizes the machine rotor coil 103.

In the exemplary embodiment of FIG. 4, the trigger circuit 24 comprises a trigger coil 32 that is inductively coupled to the transformer primary coil 3 so that the transformer primary coil 3 induces a trigger voltage in the trigger coil 32 during the operation. The trigger coil 32 is connected with one end to the first resistor R1 and with the other end to the second resistor R2. The first resistor R1 is connected to the control terminal 25. The second resistor R2 is connected to the second rectifier terminal 19 and the first switching terminal 26. With absent, i.e. no or an insufficient, induced trigger voltage, the voltage differential between the control terminal 25 and the first switching terminal 26 falls below the threshold voltage of the switch 23 and the switch 23 opens. Thus, the machine rotor coil 103 is demagnetized. In the shown exemplary embodiments, the trigger circuit 24 comprises, further to the control terminal 25 and the first switching terminal 26, connected in parallel a unidirectional suppressor diode Dt for limiting the control voltage of the switch 23. Further, a diode D5 and a third resistor R3 are connected between the trigger coil 32 and the first resistor R1.

In the exemplary embodiment of FIG. 5, the synchronous machine 1 comprises a signal transmission device 33 for the wireless signal transmission to the trigger circuit 24. The trigger circuit 24 is configured in such a manner that, on receiving a control signal received by means of the signal transmission device 33, it opens the switch 23. Thus it is possible to demagnetize the machine rotor coil 102 as required and in particular independently of the rotary transformer 1.

In the exemplary embodiment shown in FIG. 5, the signal transmission device 33 comprises a coil 37 which is non-rotatably fixed to the machine rotor 101, which is also referred to as rotor signal coil 37 in the following. In addition, the signal transmission device 33 comprises a coil 38 that is fixed relative to the machine stator 104, which is also referred to as stator signal coil 38 in the following. Further, the signal transmission device 33 comprises a signal generation unit 39 connected upstream of the stator signal coil 38. The signal transmission device 33, further, comprises a signal generation unit 39 connected upstream of the stator signal coil 38. When a demagnetization of the machine rotor coil 103 is desired, the signal generation unit 39 generates a control signal and transmits the control signal with the stator signal coil 38 to the rotor signal coil 37. In doing so, the rotor signal coil 37 substantially functions like the trigger coil 32 in the exemplary embodiment of FIG. 4. Thus, the rotor signal coil 37 is connected with one end to the first resistor R1 and with the other end to the second resistor R2. The first resistor R1 is connected to the control terminal 25. The second resistor R2 is connected to the second rectifier terminal 19 and the first switching terminal 26. In the exemplary embodiment of FIG. 5, too, a unidirectional suppressor diode Dt is connected parallel to the control terminal 25 and the first switching terminal 26, and a diode D5 and a third resistor R3 between the rotor signal coil 37 and the first resistor.

In the exemplary embodiment shown in FIG. 6, the trigger circuit 24 comprises an ammeter 34 which determines the electric current flowing through the machine rotor coil 103 during the operation. The trigger circuit 24 is configured in such a manner that it opens the switch 23 when the current determined by means of the ammeter 34 exceeds a predetermined value. Thus, it is possible to demagnetize the machine rotor coil 103 when an excessive current flows through the machine rotor coil 103.

In the exemplary embodiment shown in FIG. 6, the trigger circuit 24 comprises a comparator 35 connected to the ammeter 34 and a gate driver circuit 36 connected to the comparator 35 and the switch 23. The ammeter 34 can comprise a shunt 40 and/or a Hall sensor 41.

Although in the FIGS. 2 to 6 merely one machine rotor coil 103 each is shown, the machine rotor 101, as shown in FIG. 1, can also comprise two or more machine rotor coils 103.

The invention claimed is:

1. An externally excited electric synchronous machine, comprising:

a machine rotor including a rotor shaft and a machine rotor coil non-rotatably arranged on the rotor shaft, the machine rotor coil providing a magnetic rotor field during operation, and the machine rotor coil including a first rotor coil terminal and a second rotor coil terminal;

a machine stator including at least one machine stator coil fixed relative to the machine stator, the at least one machine stator coil providing a magnetic stator field during operation, which interacts with the rotor field such that the machine rotor rotates about an axial axis of rotation during operation;

a transformer secondary coil configured to electrically supply the machine rotor coil, the transformer secondary coil non-rotatably fixed to the machine rotor;

a rectifier circuit connected between the transformer secondary coil and the machine rotor coil, the rectifier circuit configured to convert a transformer voltage induced in the transformer secondary coil into a DC voltage during operation, and the rectifier circuit including a first rectifier terminal and a second rectifier terminal;

a protection circuit configured to protect the rectifier circuit from overvoltage, the protection circuit including a first protection terminal connected to the first rectifier terminal and a second protection terminal connected to the second rectifier terminal;

the first protection terminal connected to the first rotor coil terminal and the second protection terminal connected to the second rotor coil terminal such that the protection circuit is connected in parallel between the machine rotor and the rectifier circuit;

a switch arranged between the second rectifier terminal and the second protection terminal; and a trigger circuit connected to the switch and configured to open the switch for demagnetizing the machine rotor coil.

2. The synchronous machine according to claim 1, wherein the switch includes:

a control terminal connected to the trigger circuit;

a first switching terminal connected to the second rectifier terminal; and a second switching terminal connected to the second protection terminal.

3. The synchronous machine according to claim 2, wherein:

the trigger circuit includes a voltage divider; and the voltage divider is connected to the control terminal and the first switching terminal such that the switch opens with absent transformer voltage.

4. The synchronous machine according to claim 3, wherein the voltage divider is connected to the rectifier circuit such that the switch opens with absent DC voltage through the rectifier circuit.

5. The synchronous machine according to claim 1, further comprising an electric rotary transformer, wherein:

the rotary transformer includes a rotary transformer stator with a transformer primary coil;

the rotary transformer stator is fixed relative to the machine stator;

the rotary transformer further includes a rotary transformer rotor including the transformer secondary coil that is non-rotatable relative to the machine rotor; and the transformer primary coil and the transformer secondary coil inductively interact for providing the transformer voltage in the transformer secondary coil during operation.

6. The synchronous machine according to claim 5, wherein:

the switch includes:

a control terminal connected to the trigger circuit;

a first switching terminal connected to the second rectifier terminal; and a second switching terminal connected to the second protection terminal;

the trigger circuit includes a voltage divider that is connected to the control terminal and to the first switching terminal such that the switch opens with absent transformer voltage;

the trigger circuit further includes a trigger coil that is inductively coupled to the transformer primary coil and in which the transformer primary coil induces a trigger voltage during operation; and the trigger coil is connected to the voltage divider such that the switch opens with absent trigger voltage.

7. The synchronous machine according to claim 1, further comprising a signal transmission device configured to provide wireless signal transmission to the trigger circuit, wherein the trigger circuit is configured to open the switch upon receiving a control signal via the signal transmission device.

8. The synchronous machine according to claim 1, wherein:

the trigger circuit includes an ammeter that determines an electric current flowing through the machine rotor coil during operation; and the trigger circuit is configured to open the switch when the current determined via the ammeter exceeds a predetermined value.

9. The synchronous machine according to claim 8, wherein the trigger circuit further includes:

a comparator connected to the ammeter; and a gate driver circuit connected to the comparator and the switch.

10. The synchronous machine according to claim 1, wherein the rectifier circuit is configured to block current flow in a direction of the transformer secondary coil.

11. The synchronous machine according to claim 1, wherein the at least one machine stator coil includes at least one of (i) three machine stator coils and (ii) a number of machine stator coils that is a whole multiple of three.

12. The synchronous machine according to claim 1, wherein the synchronous machine is a traction motor of a motor vehicle.

13. The synchronous machine according to claim 1, wherein the synchronous machine is a servomotor.

14. The synchronous machine according to claim 1, wherein the at least one machine stator coil includes a plurality of coils.

15. The synchronous machine according to claim 14, wherein the switch includes:

a control terminal connected to the trigger circuit;

a first switching terminal connected to the second rectifier terminal; and a second switching terminal connected to the second protection terminal.

16. The synchronous machine according to claim 15, wherein:

the trigger circuit includes a voltage divider; and the voltage divider is connected to the control terminal and the first switching terminal such that the switch opens with absent transformer voltage.

17. The synchronous machine according to claim 16, wherein the voltage divider is connected to the rectifier circuit such that the switch opens with absent DC voltage through the rectifier circuit.

18. The synchronous machine according to claim 17, further comprising an electric rotary transformer, wherein:

the rotary transformer includes a rotary transformer stator with a transformer primary coil;

the rotary transformer stator is fixed relative to the machine stator;

the rotary transformer further includes a rotary transformer rotor including the transformer secondary coil that is non-rotatable relative to the machine rotor; and the transformer primary coil and the transformer secondary coil inductively interact for providing the transformer voltage in the transformer secondary coil during operation.

19. The synchronous machine according to claim 18, wherein:

the trigger circuit further includes a trigger coil that is inductively coupled to the transformer primary coil and in which the transformer primary coil induces a trigger voltage during operation; and the trigger coil is connected to the voltage divider such that the switch opens with absent trigger voltage.

20. The synchronous machine according to claim 19, wherein:

the trigger circuit includes:

an ammeter that determines an electric current flowing through the machine rotor coil during operation;

a comparator connected to the ammeter; and a gate driver circuit connected to the comparator and the switch; and the trigger circuit is configured to open the switch when the current determined via the ammeter exceeds a predetermined value.

* * * * *